US012311654B2

(12) United States Patent
Ozaki et al.

(10) Patent No.: US 12,311,654 B2
(45) Date of Patent: May 27, 2025

(54) PRINTING APPARATUS

(71) Applicant: SEIKO EPSON CORPORATION, Tokyo (JP)

(72) Inventors: Kazuma Ozaki, Okaya (JP); Yoshitsugu Tokai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 294 days.

(21) Appl. No.: 18/166,210

(22) Filed: Feb. 8, 2023

(65) Prior Publication Data

US 2023/0249477 A1 Aug. 10, 2023

(30) Foreign Application Priority Data

Feb. 9, 2022 (JP) ................................ 2022-018895

(51) Int. Cl.
*B41J 2/01* (2006.01)
*B41J 11/00* (2006.01)

(52) U.S. Cl.
CPC .... *B41J 11/00214* (2021.01); *B41J 11/00218* (2021.01)

(58) Field of Classification Search
CPC . B41J 11/002; B41J 11/0021; B41J 11/00212; B41J 11/00214; B41J 11/00218; B41J 11/008; B41J 2/01; B41J 2/17; B41J 2/32; B41J 2/335; B41J 2202/30; B41J 2202/31; B41J 25/001; B41M 7/0081
USPC ........................................................ 347/102
See application file for complete search history.

(56) References Cited

U.S. PATENT DOCUMENTS 8,702,225 B2 * 4/2014 Kachi ............... B41J 11/00218 347/102
11,331,935 B2 * 5/2022 Hada ..................... B41J 2/2114

FOREIGN PATENT DOCUMENTS

JP 2013-176969 A 9/2013

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

A printing apparatus includes a body portion and a carriage configured to move in a first direction along a first axis and in a second direction along a second axis orthogonal to the first axis. The carriage is mounted with a head configured to eject ink toward a medium and an irradiation unit configured to irradiate the medium with ultraviolet rays arranged side by side in the first direction. The irradiation unit includes a first contact portion and is supported movably in the second direction relative to the head. Movement of the carriage in the second direction brings the first contact portion and a second contact portion provided at the body portion into contact with each other. The irradiation unit moves in the second direction relative to the head as the carriage moves while the first contact portion and the second contact portion are in contact with each other.

7 Claims, 12 Drawing Sheets

PRINTING APPARATUS

The present application is based on, and claims priority from JP Application Serial Number 2022-018895, filed Feb. 9, 2022, the disclosure of which is hereby incorporated by reference herein in its entirety.

BACKGROUND

1. Technical Field

The present disclosure relates to a printing apparatus.

2. Related Art

Printing apparatuses using ink that is cured by being irradiated with ultraviolet rays are known in the art. For example, JP-A-2013-176969 discloses a printing apparatus including an ultraviolet (UV) irradiator. In the printing apparatus disclosed in JP-A-2013-176969, a carriage is mounted with a unit base that includes a plurality of UV irradiation units and in which the UV irradiation units are arranged side by side and fixed. The printing apparatus disclosed in JP-A-2013-176969 has been described as being able to reproduce various ultraviolet irradiation conditions by rearranging the UV irradiation units.

The printing apparatus disclosed in JP-A-2013-176969 requires a large unit base to allow the UV irradiation units to be arranged in various patterns. Thus, there is a problem that it is difficult to simplify the structures of a device for irradiating ultraviolet rays and the carriage.

SUMMARY

An aspect to solve the above problems is a printing apparatus including a body portion and a carriage configured to move in a first direction along a first axis and in a second direction along a second axis orthogonal to the first axis, wherein the carriage is mounted with a head configured to eject ink toward a medium and an irradiation unit configured to irradiate the medium with ultraviolet rays arranged side by side in the first direction, the irradiation unit includes a first contact portion and is supported movably in the second direction relative to the head, movement of the carriage in the second direction brings the first contact portion and a second contact portion provided at the body portion into contact with each other, and the irradiation unit moves in the second direction relative to the head as the carriage moves while the first contact portion and the second contact portion are in contact with each other.

DESCRIPTION OF EXEMPLARY EMBODIMENTS

1. First Embodiment

A printing apparatus 1 according to a first embodiment will be described below with reference to the drawings.

1.1. Overall Configuration of Printing Apparatus

Figure 1:
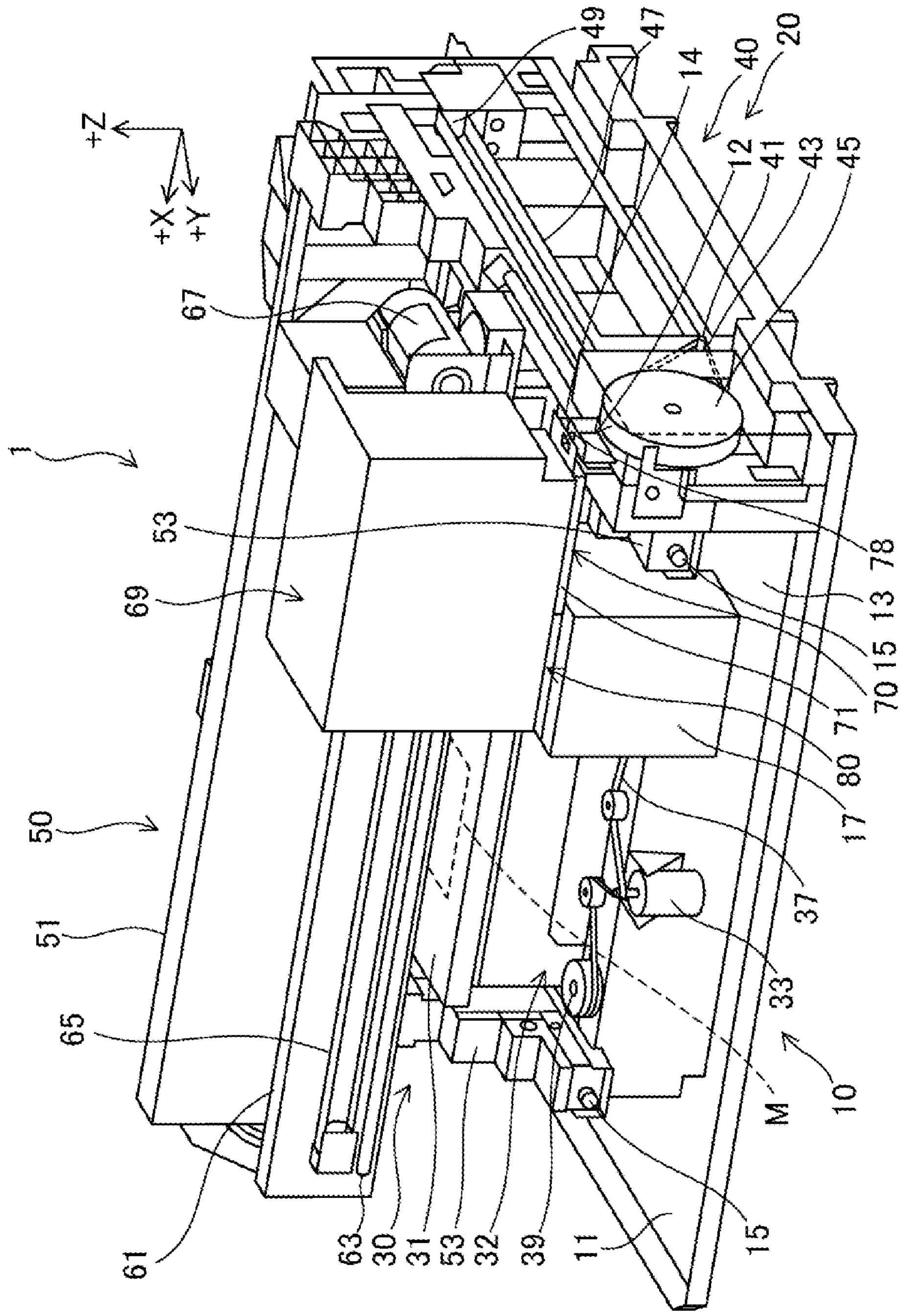
FIG. 1 is a perspective view of a printing apparatus according to a first embodiment.

FIG. 1 is a perspective view of the printing apparatus 1.

The printing apparatus 1 illustrated in FIG. 1 is an apparatus that performs printing by ejecting ink to a medium M placed on a table 31 and irradiating the medium M with ultraviolet rays to cure the ink adhering to the medium M. The medium M is a sheet, fabric, or a three-dimensional object. The sheet may be a sheet made of paper or synthetic resin. The fabric may be non-woven, knit or woven. Three-dimensional objects include accessories such as clothes or shoes, daily necessities, machine parts, or various other objects.

FIG. 1 illustrates an X axis, a Y axis and a Z axis. The X axis, the Y axis, and the Z axis are orthogonal to each other. The Z axis is an axis extending in a top-bottom direction, and can be said to be an axis extending in a vertical direction. The X and Y axes are parallel to a horizontal plane. In the following description, a direction along the X axis is defined as a left-right direction and a direction along the Y axis is defined as a forward-backward direction. Specifically, a positive direction along the Z axis is defined as an upward direction, a positive direction along the X axis is defined as a right direction, and a positive direction along the Y axis is defined as a forward direction. The X, Y, and Z axes in each drawing that will be described later indicate the same directions as those of FIG. 1. Note that the X axis corresponds to an example of a first axis and the Y axis corresponds to an example of a second axis. Additionally, the left-right direction corresponds to an example of a first direction and the forward-backward direction corresponds to an example of a second direction.

The printing apparatus 1 includes the table 31 that supports the medium M. The table 31 is a stand that moves neither in the forward-backward direction nor in the left-right direction. The table 31 supports the medium M on its flat top surface. The printing apparatus 1 supports the medium M immovably by the table 31 and causes a carriage 69 to scan the medium M supported by the table from above. The carriage 69 is mounted with a head 80 and an irradiation unit 70 arranged side by side in the left-right direction, which will be described later, and ejects ink from the head 80 toward the medium M and then irradiates the ink adhering to the medium M with ultraviolet rays from the irradiation unit 70.

The printing apparatus 1 includes a body portion 10 and a moving portion 50. The body portion 10 is a base mount that is fixed to an installation surface of the printing apparatus 1. The moving portion 50 moves along the Y axis relative to the body portion 10.

The body portion 10 includes a bottom plate 11, a base portion 13, a medium support mechanism 30, and a drive mechanism 20. The bottom plate 11 is a plate-like member that is fixed to the installation surface of the printing apparatus 1. The base portion 13 is supported by a top surface of the bottom plate 11 and supports the parts of the printing apparatus 1.

The medium support mechanism 30 includes the table 31 and a height movement mechanism 32. The table 31 includes a rectangular flat plate that is a top surface and legs disposed at the four corners of the flat plate and extending downward from the flat plate.

The height movement mechanism 32 includes a lifting motor 33, a lifting belt 37, and four lifting mechanisms 39 and moves the table 31 in a direction along the Z axis. The four lifting mechanisms 39 are each provided at a respective one of the four legs of the table 31. Each of the lifting mechanisms 39 includes a ball screw disposed along the Z axis, a nut screwed to the ball screw, and a pulley. The ball screws of the lifting mechanisms 39 are rotatably supported by the base portion 13. The nuts of the lifting mechanisms 39 are fixed to the legs of the table 31. The pulleys of the lifting mechanisms 39 are fixed to the tops of the ball screws. When the pulleys of the lifting mechanisms 39 rotate, the ball screws rotate, and as the ball screws rotate, the table moves along the Z axis together with the nuts.

The lifting motor 33 is a motor that rotates under the control of a control unit 90 that will be described later. The control unit 90 controls the direction and amount of rotation of the lifting motor 33. The lifting belt 37 is an annular belt that extends over an output shaft of the lifting motor 33 and the pulleys of the four lifting mechanisms 39. Rotation of the lifting motor 33 drives the lifting belt 37 to circulate. The lifting belt 37 transmits the rotation of the lifting motor 33 to the pulleys of the four lifting mechanisms 39. This rotates the ball screws of the lifting mechanisms 39 to move the table 31 along the Z axis.

The rotation direction of the lifting motor 33 can be switched between an advancing direction for moving the table 31 upward and a reverse direction for moving the table 31 downward. The printing apparatus 1 operates the lifting motor 33 to raise and lower the table 31.

The printing apparatus 1 changes the height of the table 31 in this way to adjust the distance between a nozzle 83 of the head 80, which will be described later, and the medium M to an optimum distance for printing.

The drive mechanism 20 includes a pair of guide shafts 15 and a frame drive unit 40. The pair of guide shafts 15 are shaft-like members extending over a pair of base portions 13 and disposed along the Y axis.

The moving portion 50 includes a main frame 51 and a pair of frame legs 53.

The main frame 51 is a plate-like member elongated in a direction along the X axis. The pair of frame legs 53 are supported movably in the forward-backward direction by the pair of guide shafts 15. The main frame 51 is fixed to the pair of frame legs 53 and supported from below by the pair of frame legs 53. The main frame 51 moves along the Y axis together with the pair of frame legs 53 while being guided by the guide shafts 15.

The frame drive unit 40 includes a frame moving motor 41, a transmission belt 43, a speed change mechanism 45, and a transmission belt 47. The frame moving motor 41 is an example of a "first motor".

The frame moving motor 41 is a motor that rotates under the control of the control unit 90 that will be described later. The transmission belt 43 is an annular belt extending between the output shaft of the frame moving motor 41 and the speed change mechanism 45 and transmits the driving force of the frame moving motor 41 to the speed change mechanism 45. The speed change mechanism 45 includes a first pulley and a second pulley. The transmission belt 43 is wound around the first pulley. The transmission belt 47 is wound around the second pulley. The speed change mechanism 45 drives the transmission belt 47 by rotating the second pulley with the driving force transmitted from the transmission belt 43 to the first pulley. The speed change mechanism 45 transmits the driving force of the frame moving motor 41 to the transmission belt 47 at a reduction ratio corresponding to the ratio of the diameters of the first and second pulleys.

The transmission belt 47 is an annular belt that extends between the speed change mechanism 45 and a pulley 49 disposed at an end in the −Y direction of the base portion 13. The pulley 49 is installed rotatably relative to the base portion 13. The transmission belt 47 is disposed along the Y axis. The pair of frame legs 53 are fixed to the transmission belt 47. Therefore, when the transmission belt 47 is driven to circulate, power is applied to move the pair of frame legs 53 along the Y axis. As a result, the moving portion 50 moves along the Y axis.

The rotation direction of the frame moving motor 41 can be switched between an advancing direction for moving the main frame 51 in the +Y direction and a reverse direction for moving the main frame 51 in the −Y direction. The printing apparatus 1 operates the frame moving motor 41 to move the main frame 51 forward and backward.

A carriage support frame 61, a carriage guide shaft 63, a carriage drive motor 67, and the carriage 69 are installed in the main frame 51. The carriage 69 includes the head 80 and the irradiation unit 70 that will be described later.

The carriage support frame 61 is a plate-like member elongated in a direction along the X axis. The carriage guide shaft 63 is fixed to the carriage support frame 61 along the X axis. The carriage 69 is supported by the carriage support frame 61 and the carriage guide shaft 63 and is movable along the carriage guide shaft 63. A left end position of a range in which the carriage 69 moves along the X axis is set as a home position. The body portion 10 includes a cleaner 17 that performs maintenance such as flushing and cleaning of the head 80 at the home position. In FIG. 1, the carriage 69 is positioned at the home position.

The carriage drive motor 67 is a motor that rotates under the control of the control unit 90 that will be described later. Rotation of the carriage drive motor 67 is transmitted to the carriage drive belt 65 and the carriage drive belt 65 is driven to circulate.

The carriage drive belt 65 is an annular belt extending over the carriage support frame 61 along the X axis direction. The carriage 69 is coupled to the carriage drive belt 65. Therefore, when the carriage drive belt 65 is driven to circulate, the carriage 69 moves along the X axis.

Additionally, as the main frame 51 moves along the Y axis, the carriage 69 moves in the forward-backward direction, that is, in the +Y and −Y directions. Thus, the printing apparatus 1 can move the carriage 69 in the forward-backward direction and the left-right direction.

As described above, the carriage 69 is mounted with the head 80. Thus, the printing apparatus 1 can move the head 80 in the forward-backward direction and the left-right direction relative to the table 31. Therefore, ink can be ejected onto the entirety of the medium M supported by the table 31. As described above, the carriage 69 is also mounted with the irradiation unit 70. Thus, the printing apparatus 1 can move the irradiation unit 70 in the forward-backward direction and the left-right direction.

Figure 2:
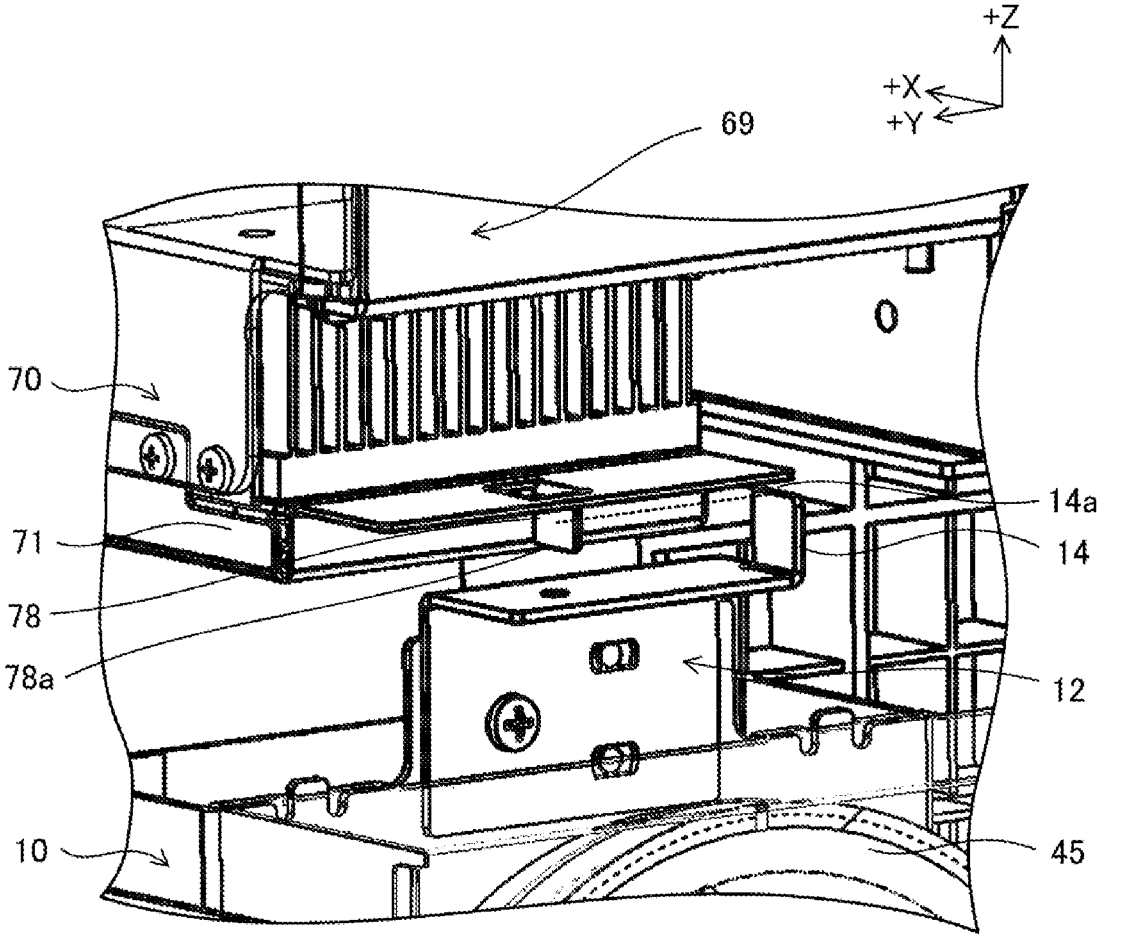
FIG. 2 is a perspective view of a main part of the printing apparatus according to the first embodiment.

FIG. 2 is a perspective view of a main part of the printing apparatus 1, and illustrates a configuration of a first contact portion 78 and its vicinity with the carriage 69 being positioned at the home position.

The irradiation unit 70 includes the first contact portion 78. The first contact portion 78 is a plate-like protrusion protruding downward. The first contact portion 78 is formed by bending downward from an end in the −X direction of a housing 71 which is an outer packaging member covering the bottom of the irradiation unit 70. The housing 71 is formed by bending a sheet metal.

A second contact portion 14 is a plate-like protrusion protruding upward. The second contact portion 14 is formed by bending upward from a contact member 12 provided at an end in the −X direction of the body portion 10. The contact member 12 is a member formed by bending a sheet metal and is fixed to the body portion 10 by screwing. The contact member 12 is positioned diagonally right forward of the table 31 without overlapping the table 31 in the forward-backward direction and without overlapping the table 31 in the left-right direction. Therefore, the second contact portion 14 is positioned at or near a front end of the body portion 10.

The first contact portion 78 and the second contact portion 14 are each formed perpendicular to the Y axis. Additionally, an upper end 14*a* of the second contact portion 14 is positioned above a lower end 78*a* of the first contact portion 78. Further, as illustrated in FIGS. 1 and 2, the first contact portion 78 of the irradiation unit 70 and the second contact portion 14 of the body portion 10 overlap each other on the X axis when the carriage 69 is positioned at the home position.

That is, when the carriage 69 is positioned at the home position, the first contact portion 78 and the second contact portion 14 partially overlap each other in the forward-backward direction. Thus, as the moving portion 50 moves in the forward-backward direction with the carriage 69 being positioned at the home position, the carriage 69 moves in the forward-backward direction, bringing the first contact portion 78 and the second contact portion 14 into contact with each other.

1.2. Configuration of Carriage

Figure 3:
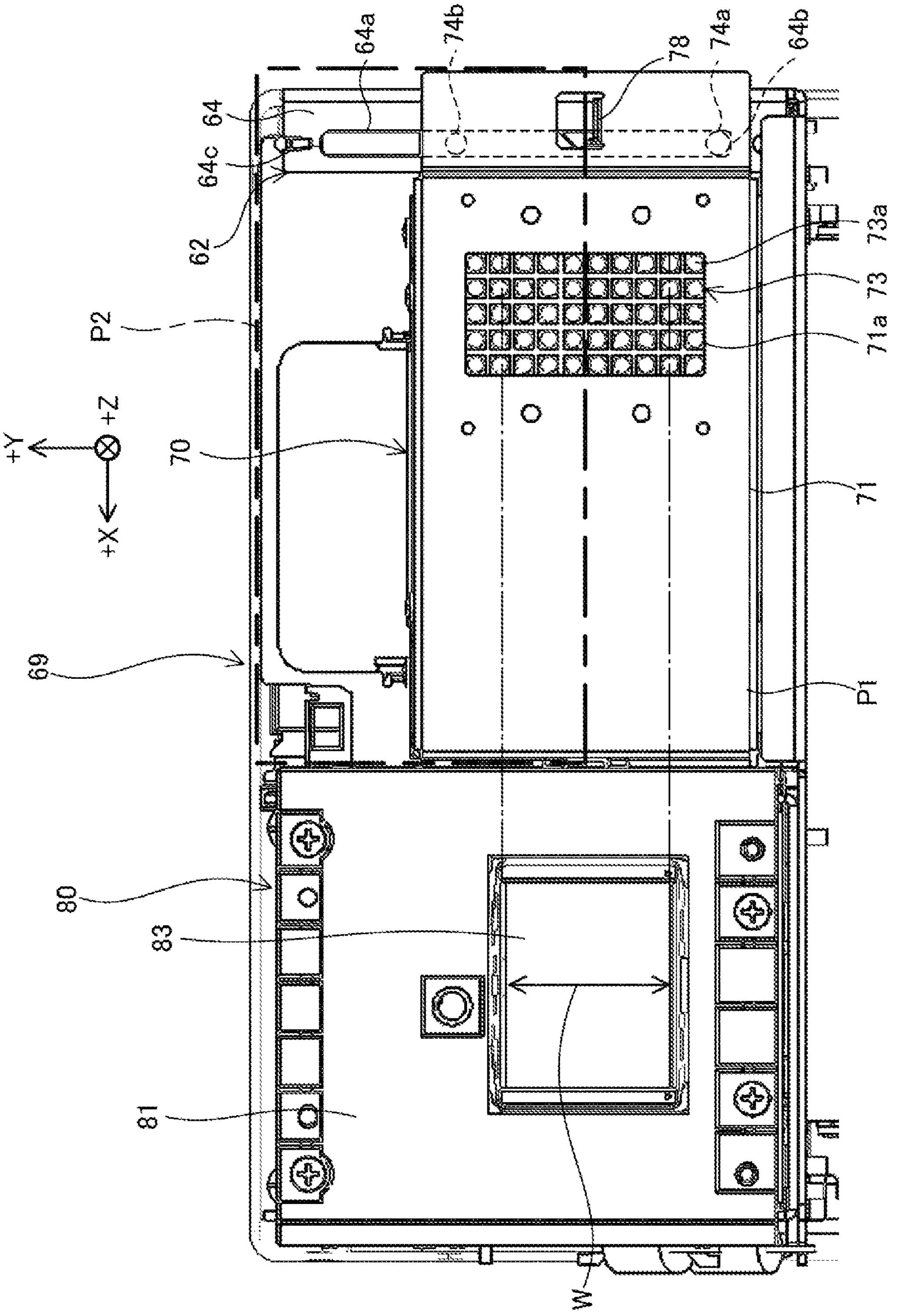
FIG. 3 is a plan view of a carriage according to the first embodiment.
Figure 4:
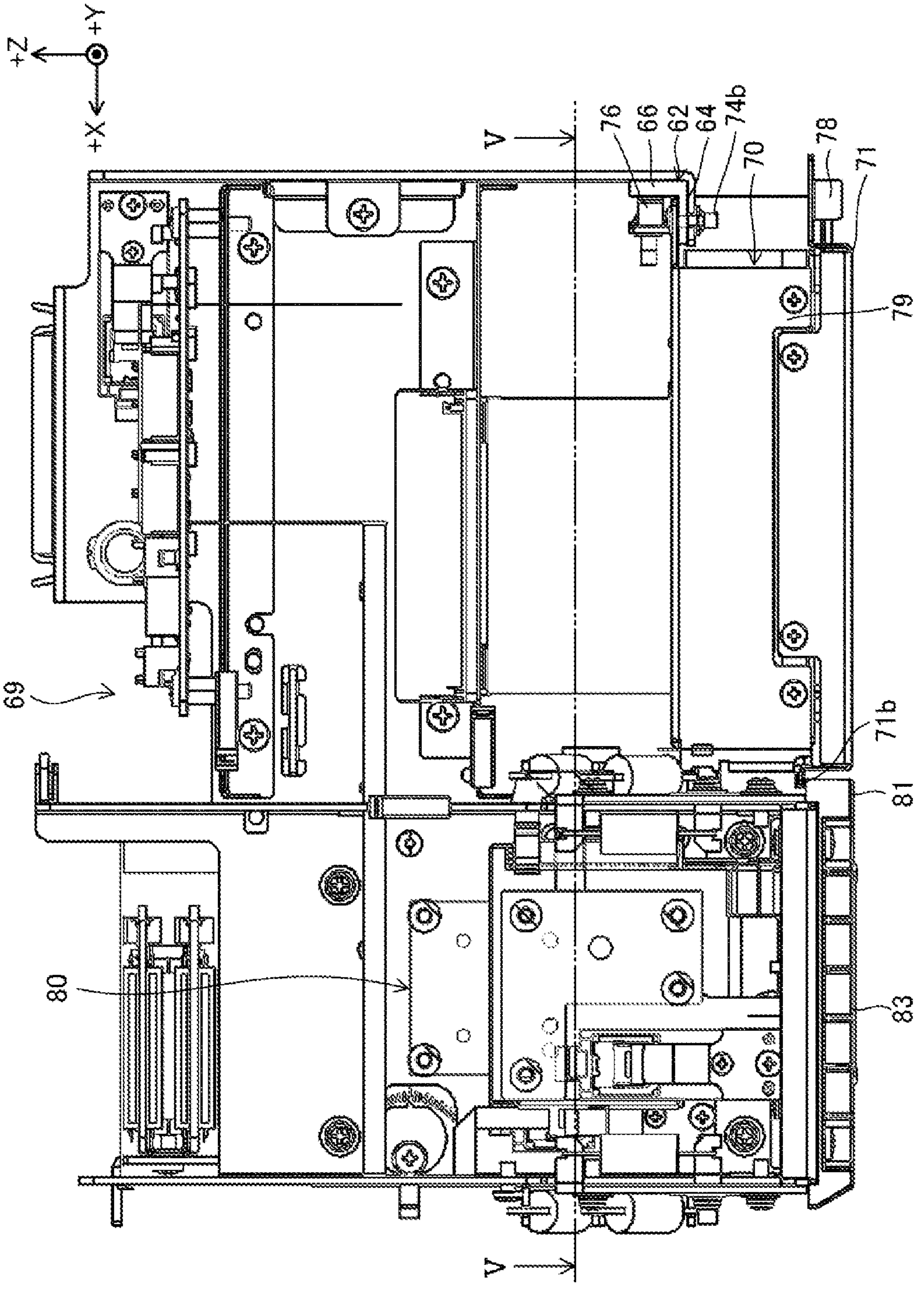
FIG. 4 is a side view of the carriage according to the first embodiment.
Figure 5:
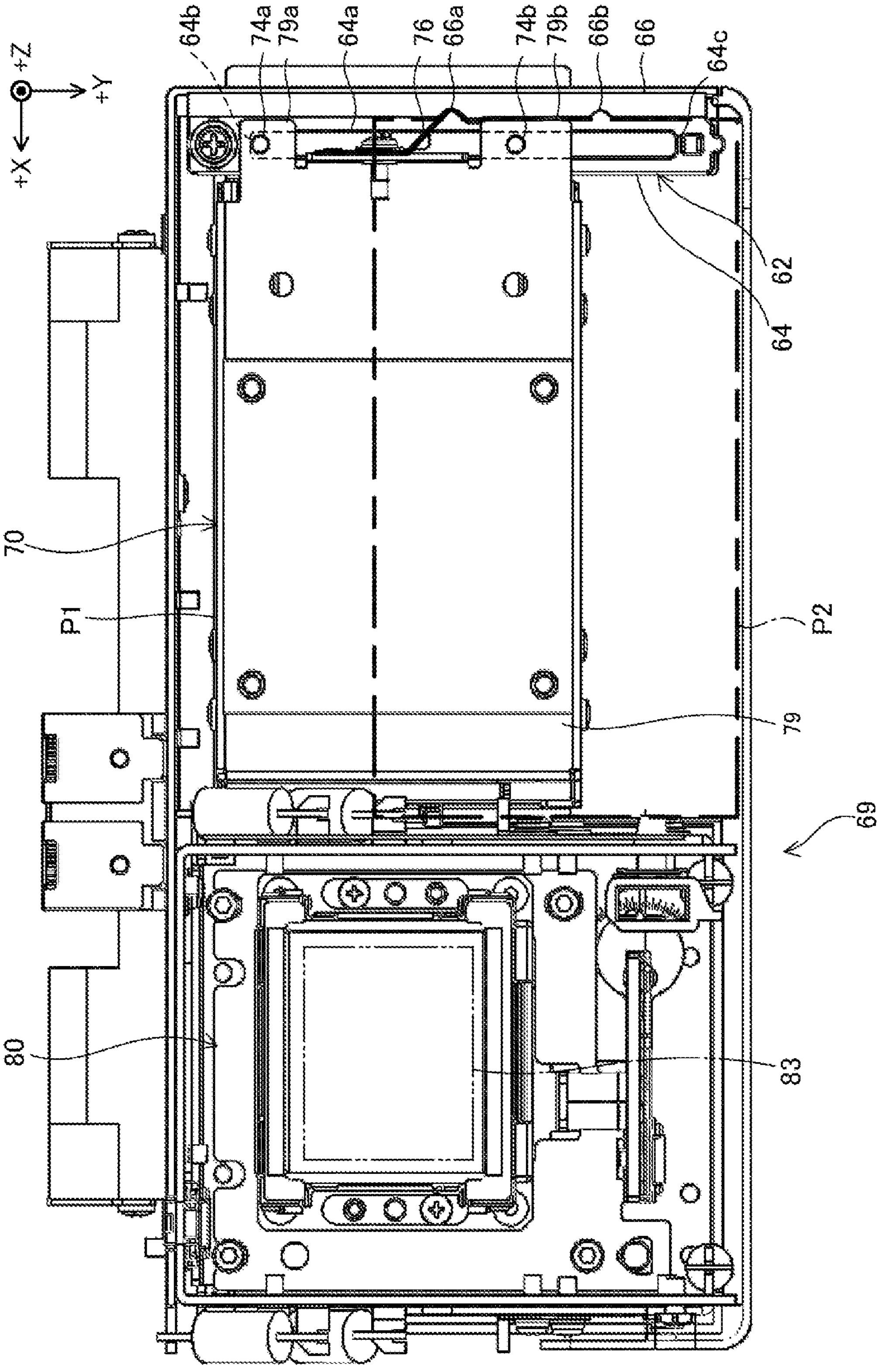
FIG. 5 is a cross-sectional view taken along the line V-V in FIG. 4.

FIG. 3 is a plan view of the carriage 69 as viewed from below. FIG. 4 is a side view of the carriage 69 as viewed from the front. FIG. 5 is a cross-sectional view taken along the line V-V in FIG. 4. For convenience of explanation, FIG. 4 illustrates the carriage 69 with its outer packaging removed.

The carriage 69 includes the head 80, the irradiation unit 70, and a guide 62. The carriage 69 is mounted with the head 80 and the irradiation unit 70 arranged side by side in the left-right direction.

The head 80 is a device that drives a piezo-actuator (not illustrated) to eject ink. The head 80 is disposed on the right side of the carriage 69 by being fixed to the outer packaging of the carriage 69. A bottom panel 81 is provided below the head 80. The bottom panel 81 is a substantially rectangular plate that is horizontally provided, and as illustrated in FIG. 3, includes a rectangular opening in the center. The nozzle 83 included in the head 80 is exposed through the opening of the bottom panel 81. The nozzle 83 includes a large number of fine holes opening downward and ejects ink through the holes to cause the ink to adhere to the medium M.

As illustrated in FIGS. 3 to 5, the guide 62 is a member fixed to the outer packaging of the carriage 69 with its longitudinal direction being the forward-backward direction. The guide 62 is provided at a left-side end of the carriage 69. As illustrated in FIG. 4, the guide 62 is an L-shaped member when viewed from the front and includes a flat plate-like guide portion 64 that is horizontally provided and a flat plate-like holding portion 66 rising vertically from an end in the −X direction of the guide portion 64.

A guide hole 64*a*, which is a substantially rectangular hole extending in the forward-backward direction, is formed in the guide portion 64. As illustrated in FIG. 5, a first recess 66*a* and a second recess 66*b*, which are both depressions recessed in the −X direction, are formed in a surface of the holding portion 66 facing in the +X direction. The first recess 66*a* is formed at or near the center of the holding portion 66. The second recess 66*b* is formed on the forward side of the first recess 66*a*.

The irradiation unit 70 is disposed on the −X direction side of the carriage 69. As illustrated in FIG. 4, the irradiation unit 70 includes a case 79 that is an outer packaging member covering an upper portion of the irradiation unit 70 and the housing 71 that is an outer packaging member covering a lower portion of the irradiation unit 70.

The irradiation unit 70 includes an irradiation port 71*a* facing downward. The irradiation port 71*a* is a rectangular hole formed through the housing 71. The irradiation port 71*a* is covered with plate glass from the inside of the housing 71. The medium M placed below the housing 71 is irradiated with ultraviolet rays emitted from a UV light source 73 provided inside the housing 71 through the plate glass and the irradiation port 71*a*. Note that the UV light source 73 is formed by arranging light-emitting elements 73*a* that emit ultraviolet rays in the X and Y axis directions. The light-emitting elements 73*a* are, for example, ultraviolet light-emitting diodes (UV-LEDs).

As illustrated in FIGS. 4 and 5, a first protrusion 79*a* and a second protrusion 79*b* are formed at a left-side end of the case 79. Both the first protrusion 79*a* and the second protrusion 79*b* protrude leftward. The first protrusion 79*a* includes a first guide pin 74*a* protruding downward. The second protrusion 79*b* includes a second guide pin 74*b* protruding downward. The first guide pin 74*a* and the second guide pin 74*b* both correspond to examples of a "guide pin". The first guide pin 74*a* and the second guide pin 74*b* are each a cylindrical pin and are disposed side by side in the forward-backward direction. The first guide pin 74*a* and the second guide pin 74*b* are both fitted into the guide hole 64*a* of the guide 62. Thus, the left-side end of the irradiation unit 70 is supported movably in the forward-backward direction relative to the carriage 69 by the guide 62.

Additionally, as illustrated in FIG. 4, a sliding member 71*b* is provided at a right-side end of the housing 71. The sliding member 71*b* is a member attached to an edge of the right-side end of the housing 71. The sliding member 71*b* bulges downward from the edge of the right-side end. The sliding member 71*b* contacts a left-side end of a top surface of the bottom panel 81 of the head 80 from above. As a result, the right-side end of the irradiation unit 70 is supported movably in the forward-backward direction relative to the carriage 69 by the bottom panel 81.

Thus, the irradiation unit 70 is supported movably in the forward-backward direction relative to the head 80 by the guide 62 and the bottom panel 81.

Additionally, as illustrated in FIG. 5, a plate spring 76 is fixed to the left-side end of the case 79. The plate spring 76 is a compression spring that is provided between the left-side end of the case 79 and the holding portion 66 and that flexes in the left-right direction. The plate spring 76 is formed bent so as to be fitted into the first recess 66*a* or the second recess 66*b*. The plate spring 76 is fitted into the first recess 66*a* or the second recess 66*b* to fix the irradiation unit 70 immovably relative to the head 80.

FIGS. 3 to 5 illustrate the carriage 69 with the plate spring 76 fitted into the first recess 66*a*. A relative position of the irradiation unit 70 relative to the head 80 in this state is defined as the first relative position P1. When the irradiation unit 70 is positioned at the first relative position P1, the entirety of the nozzle 83 of the head 80 overlaps the irradiation port 71*a* on the Y axis as illustrated in FIG. 3. Additionally, when the irradiation unit 70 is positioned at the first relative position P1, the first guide pin 74*a* is in contact with a first contact surface 64*b*, which is a rear end of the guide hole 64*a*. The first contact surface 64*b* corresponds to an example of a “contact surface”.

Figure 6:
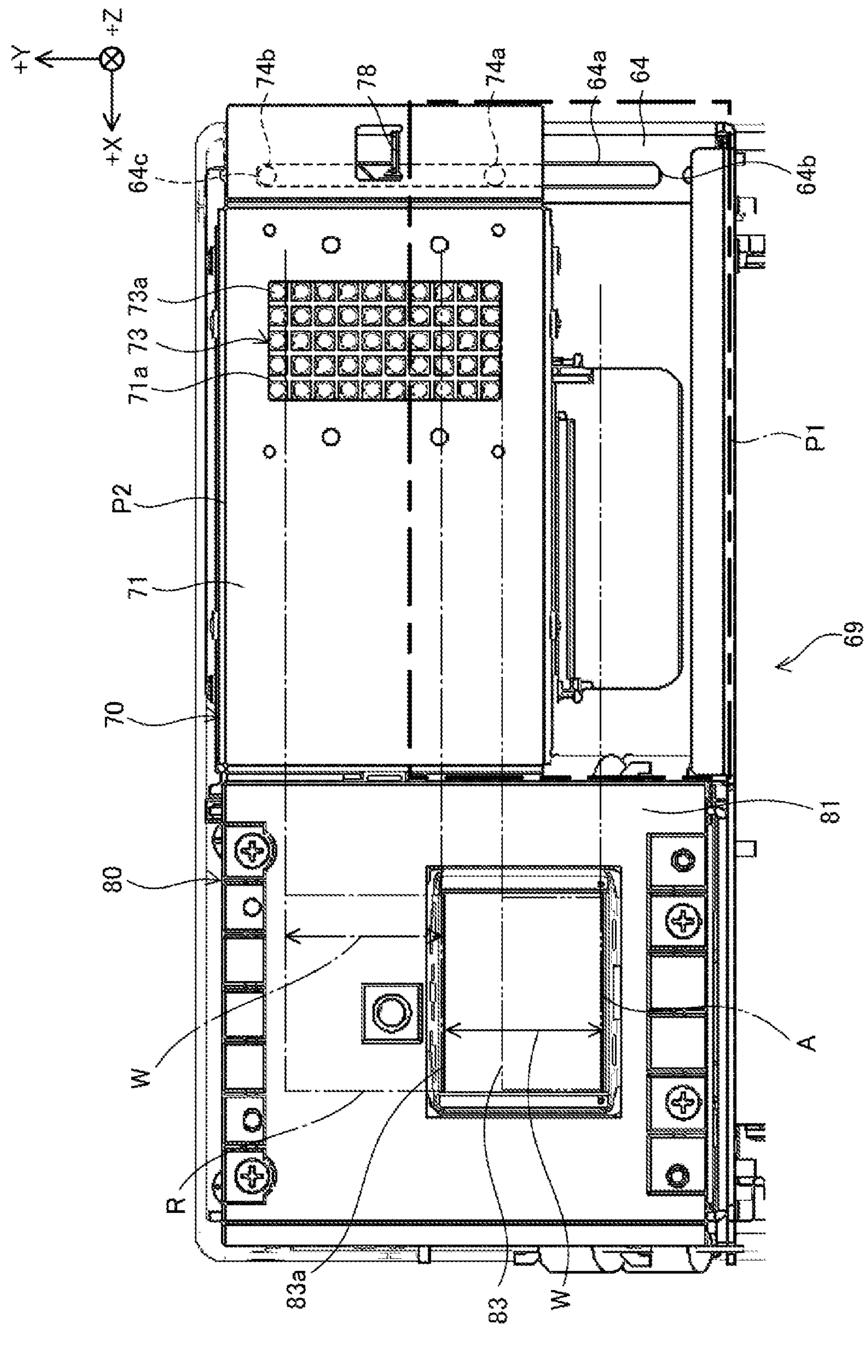
FIG. 6 is a plan view of the carriage according to the first embodiment.

FIG. 6 is a plan view of the carriage 69, and is a view of the carriage 69 as viewed from below with the plate spring 76 fitted into the second recess 66*b*. A relative position of the irradiation unit 70 relative to the head 80 in the state illustrated in FIG. 6 is defined as the second relative position P2. When the irradiation unit 70 is positioned at the second relative position P2, the irradiation port 71*a* does not overlap a part A of the nozzle 83 indicated by a phantom line on the Y axis. However, when the irradiation unit 70 is positioned at the second relative position P2, the irradiation port 71*a* overlaps the entirety of a range R on the Y axis. Here, the range R is a range from a front-side end 83*a* of the nozzle 83 to a distance W forward. Additionally, the distance W is equal to a dimension of the nozzle 83 in the forward-backward direction.

Additionally, when the irradiation unit 70 is positioned at the second relative position P2, the second guide pin 74*b* is in contact with a second contact surface 64*c*, which is a front end of the guide hole 64*a*. The second contact surface 64*c* corresponds to an example of the “contact surface”.

When the printing apparatus 1 performs a printing operation, the finish of printing is affected by a period of time from when the nozzle 83 ejects ink onto the medium M to when the ink adhering to the medium M is irradiated with ultraviolet rays from the irradiation port 71*a*. This period of time is tentatively referred to as a pre-irradiation time. If the pre-irradiation time is long, the ink adhering to the surface of the medium M is smoothed on the surface of the medium M before being cured by irradiation with ultraviolet rays. Therefore, the longer the pre-irradiation time, the higher the glossiness of the printed portion. In contrast, if the pre-irradiation time is short, the ink adhering to the surface of the medium M is cured without being sufficiently smoothed. Therefore, when the pre-irradiation time is short, the unevenness remaining on the surface of the ink is fixed, thereby reducing the glossiness. The pre-irradiation time varies depending on a positional relationship between the nozzle 83 and the irradiation port 71*a*. When the printing apparatus 1 performs printing when the irradiation unit 70 is positioned at the first relative position P1, the pre-irradiation time is short, and thus the printed material has a matte finish with low gloss. In other words, the printing apparatus 1 performs matte printing by positioning the irradiation unit 70 at the first relative position P1 and performing printing. Additionally, the printing apparatus 1 performs glossy printing with high gloss by performing printing when the irradiation unit 70 is positioned at the second relative position P2. Details of the printing operation of the printing apparatus 1 will be described later.

1.3. Configuration of Control System of Printing Apparatus

Figure 7:
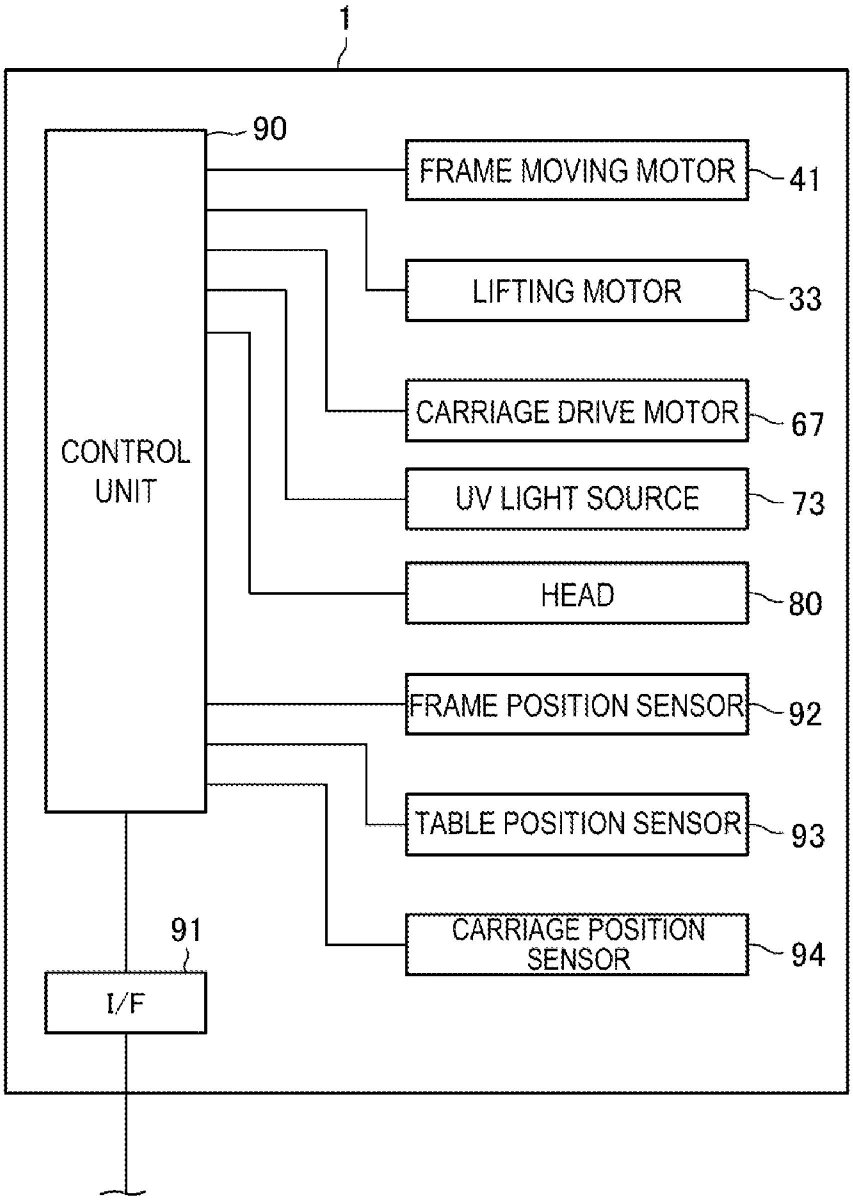
FIG. 7 is a schematic diagram illustrating a configuration of a control system of the printing apparatus according to the first embodiment.

FIG. 7 is a block diagram of the printing apparatus 1, and illustrates a functional configuration of a control system of the printing apparatus 1.

The printing apparatus 1 includes the control unit 90. The control unit 90 includes a processor such as a central processing unit (CPU) or a micro processing unit (MPU) and a storage unit. The storage unit of the control unit 90 includes a volatile memory and a non-volatile storage unit. The volatile memory is, for example, a random-access memory (RAM). The non-volatile storage unit includes a read-only memory (ROM), a hard disk, a flash memory, or the like. The control unit 90 executes programs stored in the storage unit to control the parts of the printing apparatus 1.

An interface (I/F) 91 is coupled to the control unit 90. The interface 91 is a communication device that performs wired communication using a cable or wireless communication using a wireless communication line. The interface 91 communicates with a host computer (not illustrated) to receive print data. The print data includes image or text data that the printing apparatus 1 is to print on the medium M, a command for instructing the printing apparatus 1 to perform printing, and other data.

The lifting motor 33, the frame moving motor 41, the carriage drive motor 67, the UV light source 73, and the head 80 are coupled to the control unit 90. A frame position sensor 92, a table position sensor 93, and a carriage position sensor 94 are also coupled to the control unit 90.

The control unit 90 can acquire values of currents applied to the lifting motor 33, the frame moving motor 41, and the carriage drive motor 67. The control unit 90 detects loads applied to the lifting motor 33, the frame moving motor 41, and the carriage drive motor 67 from the acquired current values.

The control unit 90 controls the turning on and off of the UV light source 73. The control unit 90 can control the turning on and off of light-emitting elements 73*a* included in the UV light source by each column arranged side by side in the forward-backward direction.

The frame position sensor 92 is a sensor that detects the position of the main frame 51 on the Y axis. For example, the frame position sensor 92 is a linear encoder disposed along the guide shaft 15. The table position sensor 93 is a sensor that detects the position of the table 31 on the Z axis. The table position sensor 93 is, for example, a rotary encoder that detects the amount of rotation of the lifting motor 33 or a rotary encoder that detects the amount of rotation of the ball screw of the lifting mechanism 39. The carriage position sensor 94 is a sensor that detects the position of the carriage 69 on the X axis. For example, the carriage position sensor 94 is a linear encoder disposed along the carriage guide shaft 63. The control unit 90 identifies the positions of the main frame 51, the table 31, and the carriage 69 based on the detection values of the frame position sensor 92, the table position sensor 93, and the carriage position sensor 94.

The control unit 90 operates each motor based on the print data received by the interface 91. Specifically, the control unit 90 controls the switching of the rotation direction of the frame moving motor 41 and the start and stop of rotation of the frame moving motor 41 to move the moving portion 50 back and forth. The control unit 90 controls the switching of the rotation direction of the lifting motor 33 and the start and stop of the rotation of the lifting motor 33 to move the table 31 along the Z axis. The control unit 90 controls the switching of the carriage drive motor 67 and the start and stop of rotation of the carriage drive motor 67 to move the carriage 69 along the X axis. In these controls, the control unit 90 uses the detection values of the frame position sensor 92, the table position sensor 93, and the carriage position sensor 94.

The control unit 90 operates the head 80 based on the print data received by the interface 91 to eject ink.

1.4. Operation of Printing Apparatus

Figure 8:
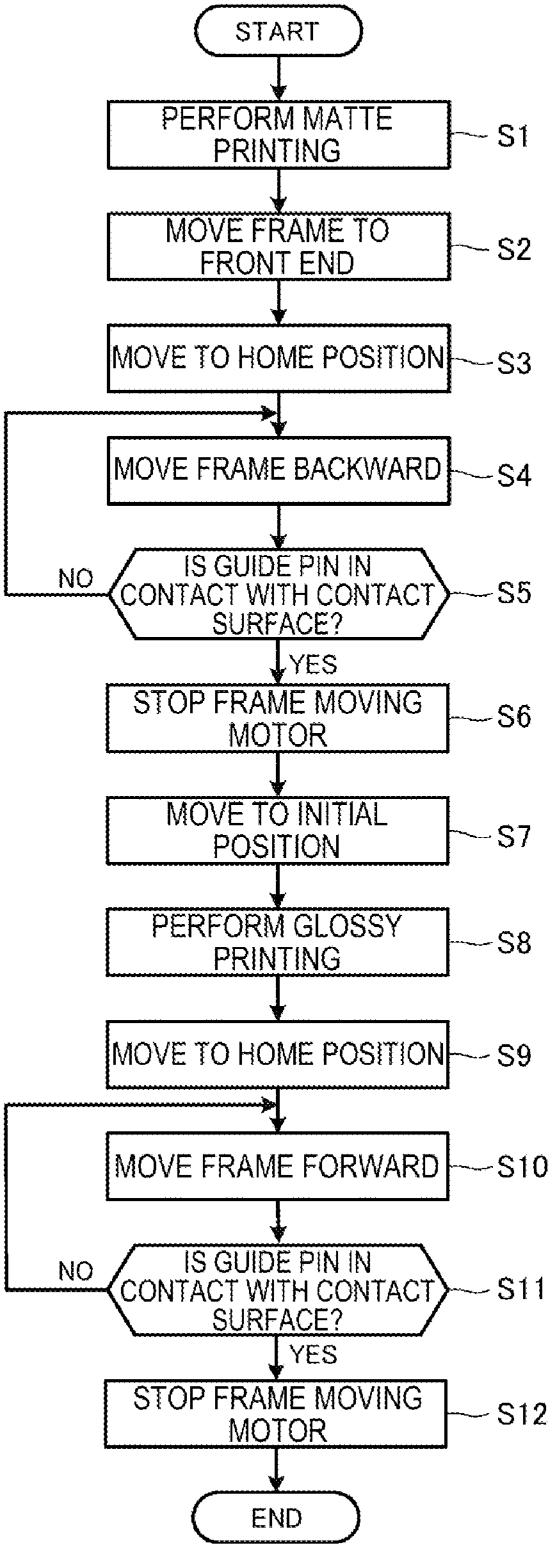
FIG. 8 is a flowchart of an operation during printing of the printing apparatus according to the first embodiment.

FIG. 8 is a flowchart illustrating the operation of the printing apparatus 1 when the printing apparatus 1 performs printing. Here, the operation of the printing apparatus 1 when following print data including an instruction to perform both matte printing and glossy printing on a medium M will be described for convenience of explanation. Note that when the printing apparatus 1 starts a printing operation, the irradiation unit 70 is positioned at the first relative position P1 as illustrated in FIGS. 3 and 5. Additionally, when the printing apparatus 1 starts the printing operation, the carriage 69 is positioned at the home position and the main frame 51 is positioned at the front-side end. Additionally, when the printing apparatus 1 starts the printing operation, the distance between the nozzle 83 and the medium M is in a state of having been adjusted to an optimum distance for printing by vertical movement of the table 31.

In step S1, the printing apparatus 1 performs matte printing based on the read print data. In matte printing, colored ink is mainly used to print patterns, text, or the like on the surface of the medium M.

When the printing apparatus 1 starts matte printing, the control unit 90 drives the frame moving motor 41 to move the main frame 51 backward, that is, in the −Y direction. At this time, the control unit 90 identifies the position of the nozzle 83 on the Y axis from a detection value of the frame position sensor 92. When the position of the nozzle 83 and an ink ejection position designated in the print data overlap on the Y axis, the control unit 90 stops driving the frame moving motor 41.

Next, the control unit 90 controls the UV light source 73 to turn on a light-emitting element 73*a* that is positioned overlapping the nozzle 83 on the Y axis. In this state, the control unit 90 drives the carriage drive motor 67 to move the carriage 69 rightward, that is, in the +X direction. While the carriage 69 is moving, the control unit 90 identifies the position of the nozzle 83 from a detection value of the carriage position sensor 94. When the position of the nozzle 83 and an ink ejection position designated in the print data overlap on the X axis, the control unit 90 controls the head 80 to eject ink through the nozzle 83.

As described above, a light-emitting element 73*a* that is positioned overlapping the nozzle 83 on the Y axis is being lit at the time of ejection of ink during the matte printing. Therefore, immediately after the ink ejected from the nozzle 83 adheres to the medium M, the ink is irradiated with ultraviolet rays from the light-emitting element 73*a* which is being lit. Thus, the ink adhering to the medium M is cured before being smoothed, resulting in a matte finish with low gloss.

When the carriage 69 has moved to the right-side end, the control unit 90 stops driving the carriage drive motor 67. After that, the control unit 90 turns off the UV light source 73. A single scan of the carriage 69 from the home position to the right-side end while the head 80 ejects ink according to print data as described so far is defined as a pass. In matte printing, after completing a first pass, the control unit 90 drives the carriage drive motor 67 to return the carriage 69 to the home position again. After that, the control unit 90 controls the frame moving motor 41 to move the main frame 51 backward by a distance W corresponding to the width of the nozzle 83 in the forward-backward direction and stops the frame moving motor 41.

After stopping the frame moving motor 41, the control unit 90 performs one pass again and returns the carriage 69 to the home position after the pass ends. After that, the control unit 90 causes the main frame 51 to move backward by the distance W again. The matte printing is completed by repeating the above operations until the nozzle 83 and the irradiation ports 71*a* scan an entire area of the medium M to be printed.

After the printing apparatus 1 completes the matte printing, the printing apparatus 1 moves the irradiation unit 70 to the second relative position P2 in steps S2 to S6 in order to perform glossy printing.

In step S2, the control unit 90 drives the frame moving motor 41 to move the main frame 51 to the front-side end.

In step S3, the control unit 90 drives the carriage drive motor 67 to move the carriage 69 to the home position. In this state, the first contact portion 78 of the irradiation unit 70 and the second contact portion 14 of the body portion 10 are positioned overlapping each other in the forward-backward direction. Additionally, the first contact portion 78 is positioned forward of the second contact portion 14.

In step S4, the control unit 90 drives the frame moving motor 41 to move the main frame 51 backward. When the main frame 51 moves backward, the first contact portion 78 also moves backward. As described above, at the end of step S3, the first contact portion 78 and the second contact portion 14 overlap each other in the forward-backward direction and the first contact portion 78 is positioned forward of the second contact portion 14. Thus, as the main frame 51 moves backward, the first contact portion 78 is brought into contact with the second contact portion 14 from the front.

Due to this contact, a resistive force from the rear to the front acts on the first contact portion 78. The resistive force acting on the first contact portion 78 is small immediately after the first contact portion 78 and the second contact portion 14 are brought into contact with each other. Therefore, the plate spring 76 is not immediately disengaged from the first recess 66*a* and the irradiation unit 70 remains positioned at the first relative position P1. As the frame moving motor 41 further continues to be driven from this state, the resistive force acting on the first contact portion 78 gradually increases. When the resistive force acting on the first contact portion 78 has become large, the plate spring 76 is disengaged from the first recess 66*a* and the irradiation unit 70 starts to move forward relative to the head 80. When the main frame 51 moves further backward, the plate spring 76 is fitted into the second recess 66*b* and the second guide pin 74*b* is brought into contact with the second contact surface 64*c*. As a result, the irradiation unit 70 is fixed at the second relative position P2. That is, the irradiation unit 70 moves forward relative to the head 80 as the carriage 69 moves backward while the first contact portion 78 and the second contact portion 14 are in contact with each other.

In step S5, the control unit 90 determines whether the second guide pin 74*b* is in contact with the second contact surface 64*c*. When the second guide pin 74*b* is in contact with the second contact surface 64*c*, the resistive force applied to the first contact portion 78 is transmitted to the frame moving motor 41 as a load. The control unit 90 identifies the load due to the transmitted resistive force by acquiring a value of the current flowing through the frame moving motor 41. When the value of the current flowing through the frame moving motor 41 is less than a predetermined value, the control unit 90 determines that the second guide pin 74*b* is not in contact with the second contact surface 64*c* (NO in step S5). In this case, the processing returns to step S4 and the control unit 90 continues to drive the frame moving motor 41 to move the main frame 51 further backward. On the other hand, when the value of the current flowing through the frame moving motor 41 exceeds a predetermined value, the control unit 90 determines that the second guide pin 74*b* is in contact with the second contact surface 64*c* (YES in step S5). In this case, the processing proceeds to step S6.

In step S6, the control unit 90 stops the frame moving motor 41. That is, the control unit 90 stops the frame moving motor 41 when the load on the frame moving motor 41 exceeds a predetermined load. As described above, the irradiation unit 70 is fixed at the second relative position P2 through the operations from step S2 to step S6.

In step S7, the control unit 90 drives the frame moving motor 41 and the carriage drive motor 67 to move the main frame 51 to the front-side end and the carriage 69 to the home position. At this time, the control unit 90 controls the frame moving motor 41 and the carriage drive motor 67 such that the first contact portion 78 and the second contact portion 14 are not brought into contact with each other. The positions of the main frame 51 and the carriage 69 at the end of step S7 after having been moved are equal to the initial positions in step S1.

In step S8, the printing apparatus 1 performs glossy printing based on the read print data. In glossy printing, transparent printing is mainly used and the surface of a part or the whole of text or patterns printed in matte printing is smoothed according to print data to increase glossiness.

In glossy printing, the printing apparatus 1 performs printing on the medium M by alternately repeating the operation of moving the main frame 51 backward by the distance W and the operation of performing one pass.

At this time, because the irradiation unit 70 is positioned at the second relative position P2, the irradiation port 71*a* and the nozzle 83 are in a positional relationship as illustrated in FIG. 6. The irradiation port 71*a* overlaps the entirety of the range R from the front-side end 83*a* of the nozzle 83 to the distance W forward on the Y axis.

Note that in step S8, the control unit 90 controls the UV light source 73 to turn on, during execution of the pass, only light-emitting elements 73*a* that overlap the range R on the Y axis. Here, the range R illustrated in FIG. 6 corresponds to the position of the nozzle 83 in one pass immediately before the pass being performed. Thus, ink that adhered to the medium M in the pass immediately before the pass being performed is irradiated with ultraviolet rays emitted from the UV light source 73. In this way, the ink that adhered to the medium M in step S8 is cured by ultraviolet rays from the UV light source 73 after the time required for performing one pass has elapsed. Thus, the ink adhering to the medium M is cured after being smoothed, resulting in a glossy finish with high gloss. The glossy printing is completed when the nozzle 83 and the irradiation ports 71*a* scan an entire area of the medium M to be printed.

After the printing apparatus 1 completes the glossy printing, operations for switching the relative position of the irradiation unit 70 in the carriage 69 to bring the printing apparatus 1 to a matte printable state are performed in steps S9 to S12. Even when the entire surface of the medium M is to be glossy, the printing apparatus 1 may print patterns or the like by matte printing as a base and then perform glossy printing with transparent ink. Therefore, at the end of a printing operation, the printing apparatus 1 completes the operation after being brought to a matte printable state in preparation for the next printing.

In step S9, the control unit 90 drives the carriage drive motor 67 to move the carriage 69 to the home position. In this state, the first contact portion 78 and the second contact portion 14 are positioned overlapping each other in the forward-backward direction. Additionally, the second contact portion 14 is fixed at or near the front-side end of the body portion 10 so that the second contact portion 14 does not contact the first contact portion 78 when the matte printing and glossy printing are performed. Thus, the first contact portion 78 is positioned backward of the second contact portion 14 upon completion of step S9.

In step S10, the control unit 90 drives the frame moving motor 41 to move the main frame 51 forward. As described above, at the start of step S10, the first contact portion 78 and the second contact portion 14 overlap each other in the forward-backward direction and the first contact portion 78 is positioned backward of the second contact portion 14. Therefore, as the main frame 51 moves forward, the first contact portion 78 is brought into contact with the second contact portion 14 from the rear.

Due to this contact, a resistive force from the front to the rear acts on the first contact portion 78. This resistive force increases as the frame moving motor 41 continues to be driven. When the resistive force acting on the first contact portion 78 has become large, the plate spring 76 is disengaged from the second recess 66*b*. After that, the irradiation unit 70 starts to move backward relative to the head 80. When the main frame 51 moves further forward, the plate spring 76 is fitted into the first recess 66*a* and the first guide pin 74*a* is brought into contact with the first contact surface 64*b*. As a result, the irradiation unit 70 is fixed at the first relative position P1. That is, the irradiation unit 70 moves backward relative to the head 80 as the carriage 69 moves forward while the first contact portion 78 and the second contact portion 14 are in contact with each other.

In step S11, the control unit 90 determines whether the first guide pin 74*a* is in contact with the first contact surface 64*b* due to the relative movement of the irradiation unit 70 within the carriage 69. Similar to step S5, when the value of a current flowing through the frame moving motor 41 is less than a predetermined value, the control unit 90 determines that the first guide pin 74*a* is not in contact with the first contact surface 64*b* (NO in step S11). In this case, the processing returns to step S10 and the control unit 90 continues to drive the frame moving motor 41 to move the main frame 51 further forward. On the other hand, when the value of the current flowing through the frame moving motor 41 exceeds a predetermined value, the control unit 90 determines that the first guide pin 74*a* is in contact with the first contact surface 64*b* (YES in step S11). In this case, the processing proceeds to step S12 and the control unit 90 stops the frame moving motor 41. That is, the control unit 90 stops the frame moving motor 41 when the load on the frame moving motor 41 exceeds a predetermined load. Such a series of operations ends upon completion of step S12.

1.5. Advantages of Embodiment

As described above, the printing apparatus 1 according to the first embodiment includes the body portion 10 and the carriage 69 configured to move in the left-right direction along the X axis and in the forward-backward direction along the Y axis orthogonal to the X axis. The carriage 69 is mounted with the head 80 configured to eject ink toward the medium M and the irradiation unit 70 configured to irradiate the medium M with ultraviolet rays arranged side by side in the left-right direction. The irradiation unit 70 includes the first contact portion 78 and is supported movably in the forward-backward direction relative to the head 80. As the carriage 69 moves in the forward-backward direction, the first contact portion 78 and the second contact portion 14 provided at the body portion 10 are brought into contact with each other. The irradiation unit 70 moves in the forward-backward direction relative to the head 80 as the carriage 69 moves while the first contact portion 78 and the second contact portion 14 are in contact with each other.

According to this configuration, the positional relationship between the head 80 and the irradiation unit 70 is variable because the irradiation unit 70 is movable in the forward-backward direction relative to the head 80. Thus, by switching the positional relationship between the head 80 and the irradiation unit 70, the printing apparatus 1 can change the time until the irradiation unit 70 irradiates the ink ejected from the head 80 with ultraviolet rays. This can simplify the irradiation unit 70, for example, as compared with the case where the time until the ink is irradiated with ultraviolet rays is changed by controlling which part of the irradiation unit having a large dimension in the Y axis direction is to be turned on. Additionally, the irradiation unit 70 can be moved relative to the head 80 by the contact of the first contact portion 78 and the second contact portion 14 without providing a new drive source. This can simplify the structure of the carriage 69.

In the printing apparatus 1, the head 80 includes the nozzle 83 configured to eject ink and the irradiation unit 70 includes the irradiation port 71*a* through which ultraviolet rays are emitted. By moving in the forward-backward direction, the irradiation unit 70 can move to the first relative position P1 where the irradiation port 71*a* overlaps the entirety of the nozzle 83 on the Y axis. The irradiation unit 70 can also move to the second relative position P2 where the irradiation port 71*a* does not overlap at least a part of the nozzle 83 on the Y axis. One example configuration is that in which, when the irradiation unit 70 is positioned at the second relative position P2, no part of the nozzle 83 overlaps the irradiation port 71*a* on the Y axis. An alternative configuration is that in which, when the irradiation unit 70 is positioned at the second relative position P2, a part of the nozzle 83 overlaps the irradiation port 71*a* on the Y axis, while another part of the nozzle 83 does not overlap the irradiation port 71*a* on the Y axis.

According to this configuration, when the irradiation unit 70 is at the first relative position P1, a printing method such as matte printing in which ink is irradiated with ultraviolet rays immediately after being ejected from the nozzle 83 can be enabled. Further, when the irradiation unit 70 is at the second relative position P2, the part of the irradiation port 71*a* that overlaps the nozzle 83 on the Y axis decreases. Thus, it is possible to change the finish of printing with the carriage 69 having a simple structure.

The printing apparatus 1 includes the frame moving motor 41 configured to move the carriage 69 in the forward-backward direction and the control unit 90 configured to control driving of the frame moving motor 41. The control unit 90 drives the frame moving motor 41 to move the irradiation unit 70 in the forward-backward direction. The control unit 90 stops the frame moving motor 41 when the load on the frame moving motor 41 exceeds the predetermined load during driving of the frame moving motor 41.

According to this configuration, whether the movement of the irradiation unit 70 relative to the head 80 has been completed can be determined by detecting the load on the frame moving motor 41 without providing a new sensor. This can simplify the configuration of the carriage 69.

2. Second Embodiment

A printing apparatus 1 according to a second embodiment will be described below with reference to the drawings. Note that in the second embodiment, the same components as those of the printing apparatus 1 according to the first embodiment are denoted by the same reference numerals as in the first embodiment and descriptions thereof will be omitted as appropriate.

2.1. Configuration of Second Contact Portion

Figure 9:
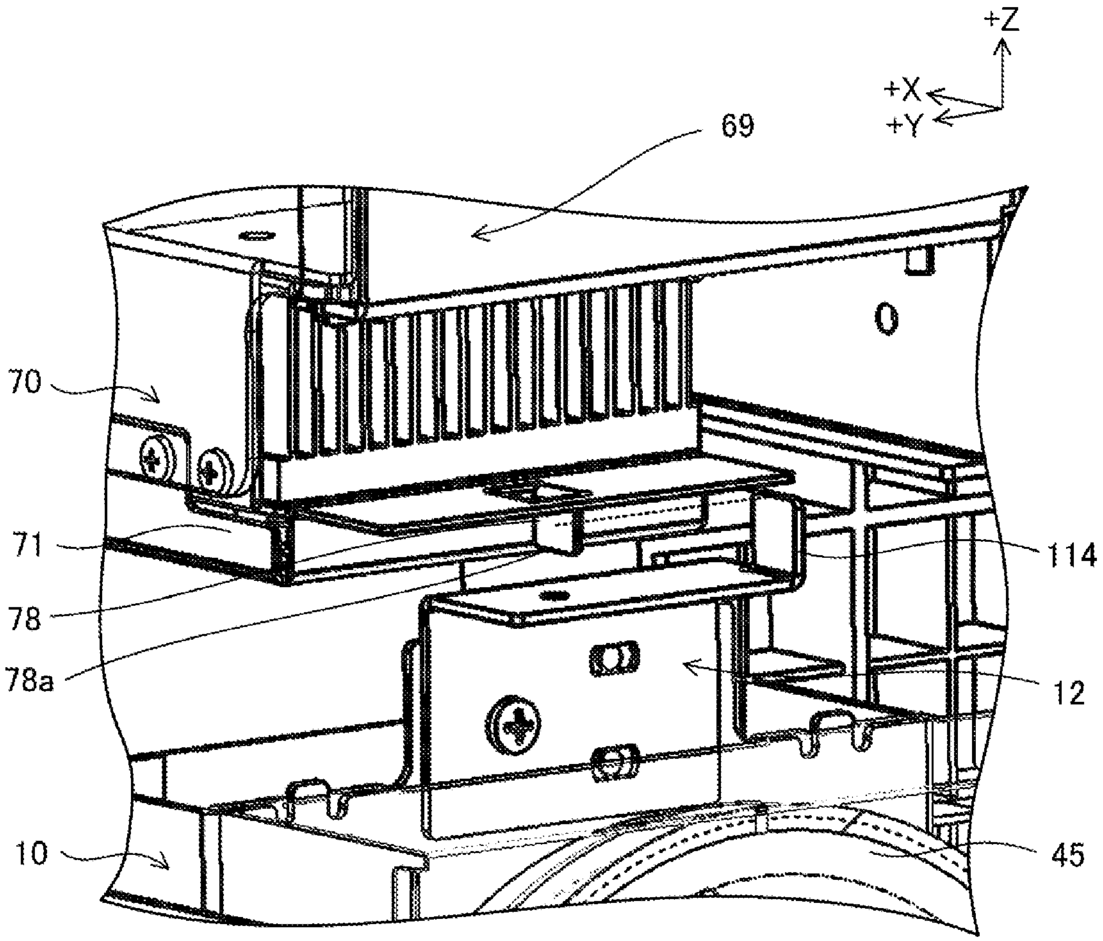
FIG. 9 is a perspective view of a main part of a printing apparatus according to a second embodiment.

FIG. 9 is a perspective view of a main part of the printing apparatus 1 according to the second embodiment, and illustrates a configuration of a second contact portion 114 and its vicinity.

In the second embodiment, the second contact portion 114 is a flat plate-like elastic member fixed to a contact member 12. The second contact portion 114 is formed of, for example, rubber or silicon. The second contact portion 114 is provided so as to be perpendicular to the Y axis when no load is applied to the second contact portion 114. The second contact portion 114 bends in the forward-backward direction when the second contact portion 114 is in contact with a first contact portion 78 and is pressed against the first contact portion 78 in the forward-backward direction.

2.2. Configuration of Carriage

Figure 10:
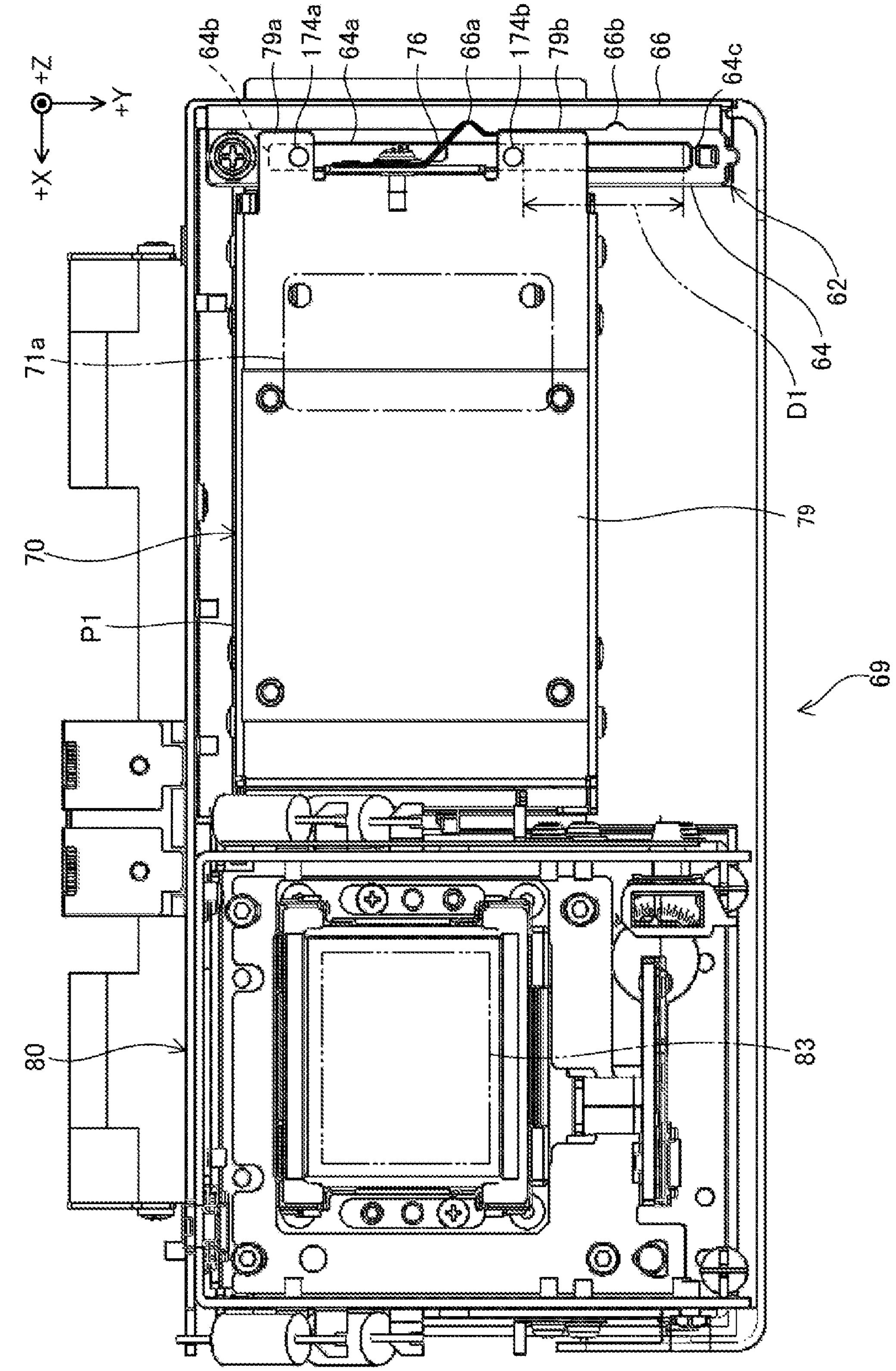
FIG. 10 is a cross-sectional view of a carriage according to the second embodiment.
Figure 11:
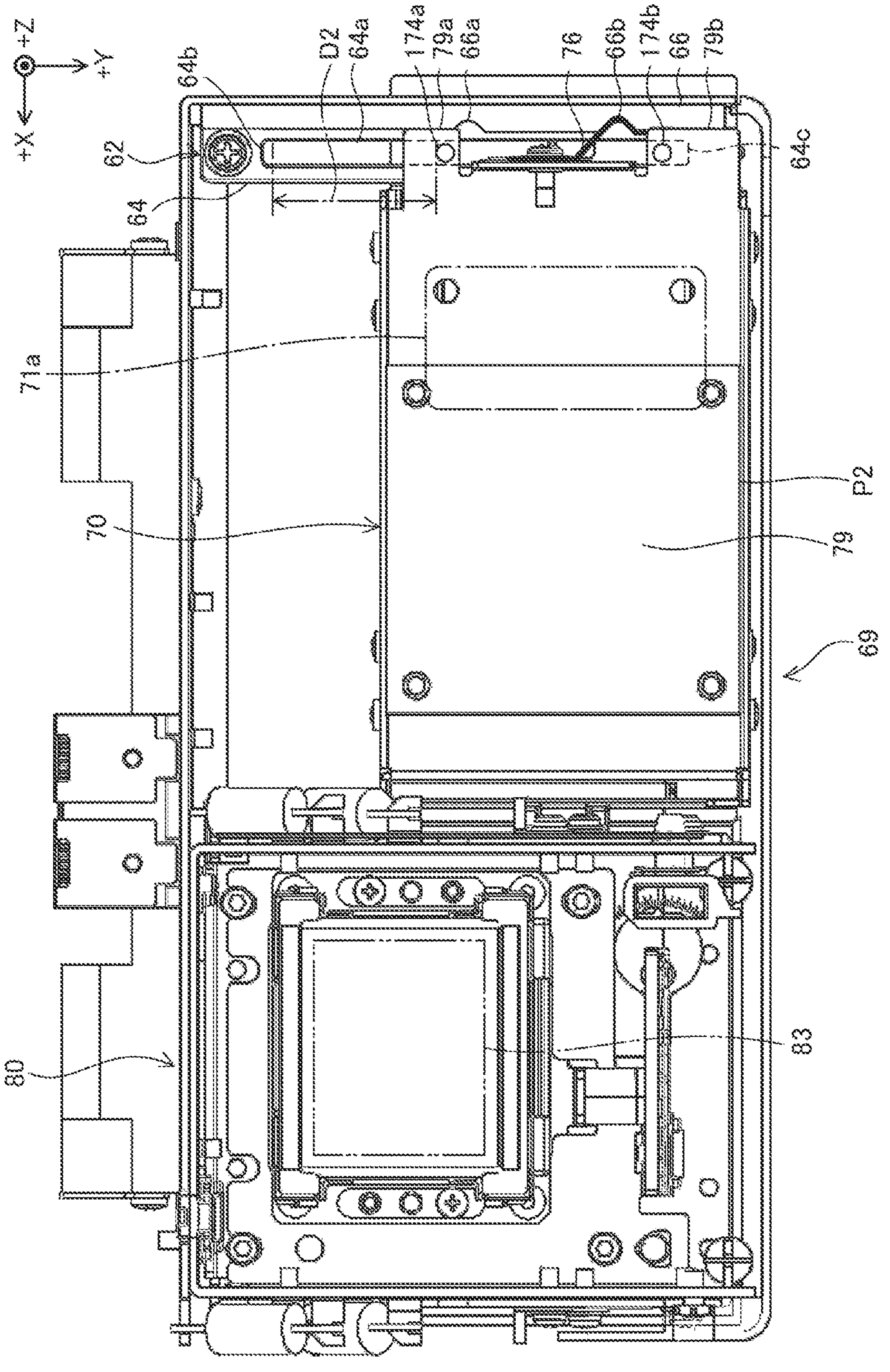
FIG. 11 is a cross-sectional view of the carriage according to the second embodiment.

FIGS. 10 and 11 are cross-sectional views of a carriage 69 according to the second embodiment taken at the same position as that in FIG. 5. FIG. 10 illustrates the case where an irradiation unit 70 is positioned at a first relative position P1. FIG. 11 illustrates the case where the irradiation unit 70 is positioned at a second relative position P2.

In the irradiation unit 70 according to the second embodiment, a first guide pin 174*a* is provided closer to the center of the irradiation unit 70 in the forward-backward direction than in the first embodiment. Thus, as illustrated in FIG. 10, the first guide pin 174*a* is not in contact with a first contact surface 64*b* when the irradiation unit 70 is positioned at the first relative position P1.

Similarly, a second guide pin 174*b* is provided closer to the center of the irradiation unit 70 in the forward-backward direction than in the first embodiment. Thus, as illustrated in FIG. 11, the second guide pin 174*b* is not in contact with a second contact surface 64*c* when the irradiation unit 70 is positioned at the second relative position P2.

2.3. Operation of Printing Apparatus

Figure 12:
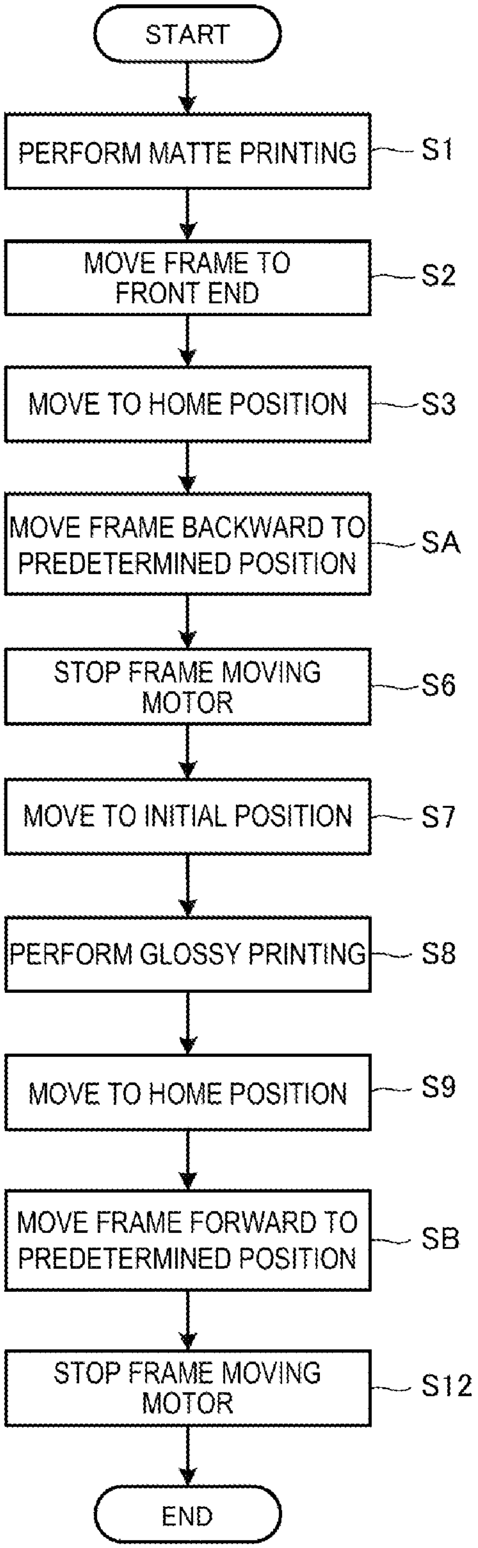
FIG. 12 is a flowchart of an operation during printing of the printing apparatus according to the second embodiment.

FIG. 12 is a flowchart illustrating the operation of the printing apparatus 1 according to the second embodiment, and illustrates the operation when the printing apparatus 1 performs printing. Note that steps for performing operations the same as or similar to those in the flowchart of FIG. 8 in the first embodiment are denoted by the same reference numerals and descriptions thereof will be omitted.

In the second embodiment, after step S3 ends, the control unit 90 drives the frame moving motor 41 to move the main frame 51 backward in step SA. This operation causes the first contact portion 78 to start coming into contact with the second contact portion 114 from the front. The control unit 90 further continues to drive the frame moving motor 41 from this state to move the main frame 51 further backward by a distance D1. The distance D1 is a distance slightly shorter than the spacing between the second guide pin 174*b* and the second contact surface 64*c* when the irradiation unit 70 is positioned at the first relative position P1 as illustrated in FIG. 10. Note that the distance D1 is longer than the distance of movement of the irradiation unit 70 when the irradiation unit 70 is moved from the first relative position P1 to the second relative position P2 while the carriage 69 is stationary. Therefore, due to this operation, the first contact portion 78 and the second contact portion 114 are pressed against each other and the irradiation unit 70 relatively moves to the second relative position P2.

At this time, a plate spring 76 is fitted into a second recess 66*b* to prevent the second guide pin 174*b* from contacting the second contact surface 64*c*. Additionally, as the plate spring 76 is fitted into the second recess 66*b*, the irradiation unit 70 is fixed at the second relative position P2. Note that the plate spring 76 corresponds to an example of a "first member". After that, the processing proceeds to step S6 and the control unit 90 stops the frame moving motor 41. Hereinafter, the position of the carriage 69 at which the main frame 51 moved in step SA stops in step S6 is defined as a second switching position. The second switching position corresponds to an example of a "predetermined position". That is, in step SA, the control unit 90 drives the frame moving motor 41 to move the irradiation unit 70 backward and further drives the frame moving motor 41 while the first contact portion 78 and the second contact portion 114 are in contact with each other. As a result, the control unit 90 moves the carriage 69 to the second switching position in the direction in which the first contact portion 78 and the second contact portion 114 are pressed against each other.

The position of the main frame 51 when the first contact portion 78 starts coming into contact with the second contact portion 114 from the front in step SA depends on the dimensions of the members of the printing apparatus 1. The distance D1 also depends on the dimensions of the members of the carriage 69. Thus, the second switching position is determined at the time of design. Therefore, the control unit 90 can store the second switching position. That is, to realize the operation in step SA, the control unit 90 only has to drive the frame moving motor 41 until the carriage 69 reaches the second switching position stored in advance in the storage unit. Note that at this time, the control unit 90 detects the current position of the main frame 51 from a detection value of the frame position sensor 92 and identifies the current position of the carriage 69 based the detected current position of the main frame 51.

The printing apparatus 1 according to the second embodiment performs operations the same as or similar to those of the first embodiment from step S6 to step S9.

After step S9 ends, the control unit 90 drives the frame moving motor 41 to move the main frame 51 forward in step SB. This operation causes the first contact portion 78 to start coming into contact with the second contact portion 114 from the rear. The control unit 90 further continues to drive the frame moving motor 41 from this state to move the main frame 51 further backward by a distance D2. The distance D2 is a distance slightly shorter than the spacing between the first guide pin 174*a* and the first contact surface 64*b* when the irradiation unit 70 is positioned at the second relative position P2 as illustrated in FIG. 11. Note that the distance D2 is longer than the distance of movement of the irradiation unit 70 when the irradiation unit 70 is moved from the second relative position P2 to the first relative position P1 while the carriage 69 is stationary. Therefore, due to this operation, the first contact portion 78 and the second contact portion 114 are pressed against each other and the irradiation unit 70 relatively moves to the first relative position P1.

At this time, the plate spring 76 is fitted into a first recess 66*a* to prevent the first guide pin 174*a* from contacting the first contact surface 64*b*. Additionally, as the plate spring 76 is fitted into the first recess 66*a*, the irradiation unit 70 is fixed at the first relative position P1. After that, the processing proceeds to step S12 and the control unit 90 stops the frame moving motor 41, ending a series of operations. Hereinafter, the position of the carriage 69 at which the main frame 51 moved in step SB stops in step S12 is defined as a first switching position. The first switching position corresponds to an example of a "predetermined position". That is, in step SB, the control unit 90 drives the frame moving motor 41 to move the irradiation unit 70 forward and further drives the frame moving motor 41 while the first contact portion 78 and the second contact portion 114 are in contact with each other. As a result, the control unit 90 moves the carriage 69 to the first switching position in the direction in which the first contact portion 78 and the second contact portion 114 are pressed against each other.

The first switching position is determined at the time of design, similar to the second switching position described above. Therefore, to realize the operation in step SB, the control unit 90 only has to drive the frame moving motor 41 until the carriage 69 reaches the first switching position stored in advance in the storage unit. Note that at this time, the control unit 90 detects the position of the main frame 51 from a detection value of the frame position sensor 92 and identifies the current position of the carriage 69 based the detected position of the main frame 51.

Note that although the first switching position and the second switching position stored in the storage unit by the control unit 90 are determined at the time of design, the dimensions of the members in the actual printing apparatus 1 vary. In contrast, in the second embodiment, the second contact portion 114 is an elastic member and the main frame 51 moves by a distance slightly greater than the distance by which the irradiation unit 70 relatively moves when switching between the first relative position P1 and the second relative position P2. This absorbs variations in the dimensions of the members of the printing apparatus 1, reliably switching the relative position of the irradiation unit 70. This also inhibits the first contact portion and the second contact portion from being strongly pressed against each other and being damaged.

2.4. Advantages of Embodiment

As described above, in the printing apparatus 1 according to the second embodiment, an elastic member having elasticity is disposed at at least one of the first contact portion 78 and the second contact portion 114.

According to this configuration, the first contact portion 78 and the second contact portion 114 are less likely to be damaged when they are strongly pressed against each other. Thus, it is possible to inhibit damage to the first contact portion 78 and the second contact portion 114 with a simple configuration.

The printing apparatus 1 includes the frame moving motor 41 configured to move the carriage 69 in the forward-backward direction and the control unit 90 configured to control driving of the frame moving motor 41. The control unit 90 drives the frame moving motor 41 to move the irradiation unit 70 in the forward-backward direction. The control unit 90 further drives the frame moving motor 41 while the first contact portion 78 and the second contact portion 114 are in contact with each other to move the carriage 69 to a predetermined position in the direction in which the first contact portion 78 and the second contact portion 114 are pressed against each other.

According to this configuration, the relative position of the irradiation unit 70 relative to the head 80 can be switched without providing a new sensor or the like. This can simplify the configuration of the carriage 69.

The carriage 69 includes the guide 62 including the guide hole 64*a* extending along the forward-backward direction and the irradiation unit 70 includes the first guide pin 174*a* and the second guide pin 174*b* to be fitted into the guide hole 64*a*. The first contact surface 64*b* and the second contact surface 64*c* are provided at the ends in the forward-backward direction of the guide hole 64*a*. The irradiation unit 70 includes the plate spring 76 configured to prevent the first guide pin 174*a* and the second guide pin 174*b* from contacting the first contact surface 64*b* and the second contact surface 64*c*, respectively.

According to this configuration, it is possible to inhibit the first guide pin 174*a* and the second guide pin 174*b* from being strongly pressed against the first contact surface 64*b* and the second contact surface 64*c*, respectively, and being damaged. Thus, it is possible to increase the durability of the carriage 69 with a simple configuration.

In the carriage 69, the guide 62 includes the first recess 66*a* and the second recess 66*b*. As the plate spring 76 is fitted into the first recess 66*a*, the irradiation unit 70 is fixed at the first relative position P1. As the plate spring 76 is fitted into the second recess 66*b*, the irradiation unit 70 is fixed at the second relative position P2. When the irradiation unit 70 is positioned at the first relative position P1 or the second relative position P2, the first guide pin 174*a* and the second guide pin 174*b* do not contact the first contact surface 64*b* and the second contact surface 64*c*, respectively.

According to this configuration, it is possible to fix the relative position of the irradiation unit 70 relative to the head 80 by the plate spring 76 that prevents the first guide pin 174*a* and the second guide pin 174*b* from contacting the first contact surface 64*b* and the second contact surface 64*c*, respectively. Thus, reliable printing can be realized while the carriage 69 has a simple configuration.

3. Other Embodiments

The above embodiments merely illustrate specific examples to which the present disclosure is applied. The present disclosure is not limited to the configurations of the above embodiments and can be carried out in various aspects without departing from the spirit of the disclosure.

In the second embodiment, the second contact portion 114 has been described as being an elastic member formed of rubber or silicon, but this is just an example. The second contact portion 114 may be, for example, a member having elasticity in the forward-backward direction due to its shape such as a coil spring or a plate spring. An elastic member may also be disposed at the first contact portion 78.

In the first and second embodiments, the irradiation unit 70 has been described as being provided on the left side of the head 80, but this is just an example. For example, irradiation units 70 may be provided on both sides in the left-right direction of the head 80. Further, the two irradiation units 70 may move in an integrated manner relative to the head 80 by the contact of the first contact portion 78 and the second contact portion 14 or 114. In this case, the printing apparatus 1 can also perform printing when the carriage 69 is moved from the right side to the left side and thus the printing speed is improved.

Additionally, a configuration that uses the frame moving motor 41, the transmission belt 43, the speed change mechanism 45, and the transmission belt 47 has been described as a configuration for the printing apparatus 1 to move the moving portion 50 along the Y axis, but this is an example. For example, the printing apparatus 1 may be configured such that the left-side guide shaft 15 is constituted by a ball screw, a nut that engages with the ball screw is fixed to the left-side frame leg 53, and the left-side guide shaft 15 is rotated by the driving force of the frame moving motor 41. Alternatively, the printing apparatus 1 may be configured such that the driving force is applied to both of the pair of frame legs 53 of the main frame 51 to move the moving portion 50 in the forward-backward direction. Similarly, the carriage drive belt 65 has been described as a configuration for the printing apparatus 1 to cause the carriage 69 to scan in the left-right direction, but this is an example. A configuration that uses a ball screw and a nut instead of the carriage drive belt 65 may be adopted or the carriage 69 may be moved by a linear motor. Additionally, the height movement mechanism 32 that drives the lifting mechanism 39 by the lifting belt 37 has been described as a configuration for raising and lowering the table 31, but this is an example. For example, the printing apparatus 1 may raise and lower the table 31 by a rack and pinion mechanism. The top surface of the table 31 is not limited to a flat surface. For example, the table 31 may be a base mount including a holder for holding the medium M such as a claw or a belt. The top surface of the table 31 may also be, for example, a recess into which the medium M is fitted. Other mechanical configurations of the printing apparatus 1 can be appropriately modified to configurations that can achieve advantages the same as or similar to those of the present disclosure.

The configuration of the printing apparatus 1 including the frame position sensor 92, the table position sensor 93, and the carriage position sensor 94 illustrated in FIG. 7 is an example. For example, the printing apparatus 1 may identify the position of the main frame 51 by detecting the amount of rotation of the frame moving motor 41. Similarly, the printing apparatus 1 may identify the position of the table 31 by detecting the amount of rotation of the lifting motor 33 and may identify the position of the carriage 69 by detecting the amount of rotation of the carriage drive motor 67.

At least a part of the functional blocks illustrated in FIG. 7 may be realized by hardware or may be realized by software and hardware in cooperation. The processing units of the flowcharts of FIGS. 8 and 12 have been divided according to main processing steps to facilitate understanding of the operation of the printing apparatus 1. Therefore, the embodiments are not limited by the division method and names of the illustrated processing units.

What is claimed is:

1. A printing apparatus comprising:

a body portion; and a carriage configured to move in a first direction along a first axis and in a second direction along a second axis orthogonal to the first axis, wherein the carriage is mounted with a head configured to eject ink toward a medium and an irradiation unit configured to irradiate the medium with ultraviolet rays arranged side by side in the first direction, the irradiation unit includes a first contact portion and is supported movably in the second direction relative to the head, movement of the carriage in the second direction brings the first contact portion and a second contact portion provided at the body portion into contact with each other, and the irradiation unit moves in the second direction relative to the head as the carriage moves while the first contact portion and the second contact portion are in contact with each other.

2. The printing apparatus according to claim 1, wherein the head includes a nozzle configured to eject the ink, the irradiation unit includes an irradiation port through which ultraviolet rays are emitted, and the irradiation unit is configured to move, by moving in the second direction, to a first relative position where the irradiation port overlaps an entirety of the nozzle on the second axis and a second relative position where the irradiation port does not overlap at least a part of the nozzle on the second axis.

3. The printing apparatus according to claim 2, further comprising:

a first motor configured to move the carriage in the second direction; and a control unit configured to control driving of the first motor, wherein the control unit drives the first motor to move the irradiation unit in the second direction and stops the first motor when a load on the first motor exceeds a predetermined load during driving of the first motor.

4. The printing apparatus according to claim 2, wherein an elastic member having elasticity is disposed at at least one of the first contact portion and the second contact portion.

5. The printing apparatus according to claim 4, further comprising:

a first motor configured to move the carriage in the second direction; and a control unit configured to control driving of the first motor, wherein the control unit drives the first motor to move the irradiation unit in the second direction and the control unit further drives the first motor while the first contact portion and the second contact portion are in contact with each other to move the carriage to a predetermined position in a direction in which the first contact portion and the second contact portion are pressed against each other.

6. The printing apparatus according to claim 5, wherein the carriage includes a guide including a guide hole extending along the second direction, the irradiation unit includes a guide pin to be fitted into the guide hole, a contact surface is provided at an end in the second direction of the guide hole, and the irradiation unit includes a first member configured to prevent the guide pin from contacting the contact surface.

7. The printing apparatus according to claim 6, wherein the guide includes a first recess and a second recess, the irradiation unit is fixed at the first relative position as the first member is fitted into the first recess, the irradiation unit is fixed at the second relative position as the first member is fitted into the second recess, and the guide pin does not contact the contact surface when the irradiation unit is positioned at the first relative position or the second relative position.

* * * * *